L. M. STEGNER.
LAND-ROLLER.

No. 188,484.  Patented March 20, 1877.

Attest:
C. A. Snow
John P. Brooks.

Inventor:
Louis M. Stegner
by Louis Bagger & Co.
Att'ys.

UNITED STATES PATENT OFFICE.

LOUIS M. STEGNER, OF HARVEYVILLE, KANSAS.

IMPROVEMENT IN LAND-ROLLERS.

Specification forming part of Letters Patent No. 188,484, dated March 20, 1877; application filed October 19, 1876.

*To all whom it may concern:*

Be it known that I, LOUIS M. STEGNER, of Harveyville, in the county of Wabaunsee and State of Kansas, have invented certain new and useful Improvements in Land-Rollers; and I do hereby declare that the following is a full, clear, and exact description thereof, which will enable others skilled in the art to which it appertains to make and use the same, reference being had to the accompanying drawings, which form a part of this specification, and in which—

Figure 1:
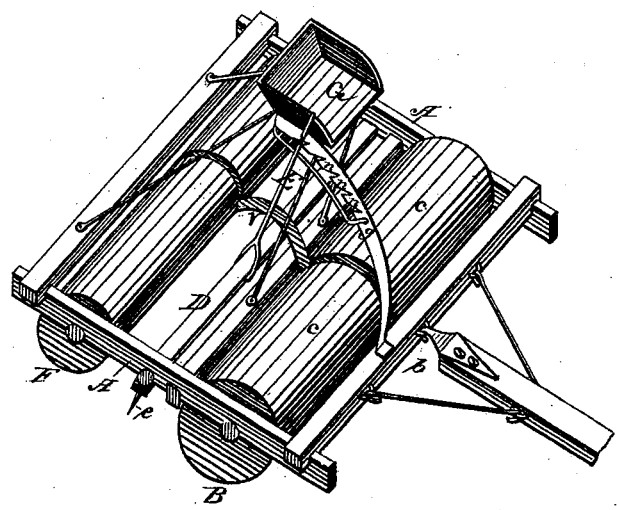
Figure 2:
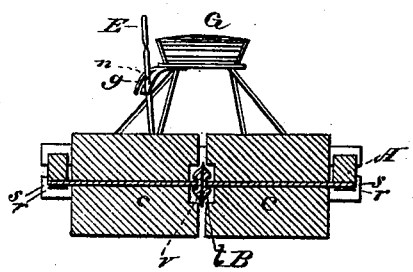
Figure 3:
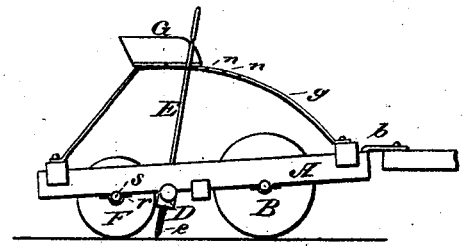
Figure 4:
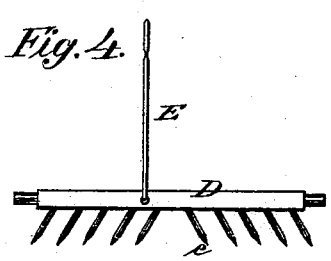

Figure 1 is a perspective view. Fig. 2 is a section taken through the front rollers. Fig. 3 is a side elevation, and Fig. 4 is the toothed bar D detached.

Similar letters of reference indicate corresponding parts in all the figures.

This invention consists, first, in the arrangement, between two parallel rollers of different size and weight, of a lateral bar having a set of harrow-teeth for cultivating the soil; and, second, in an improved construction of rollers, by making them in sections, for the purpose of facilitating the operation, all as hereinafter more fully shown and specified.

In the drawing, A is the frame for holding the operating parts of my improved land-roller. This consists of stout beams, secured together in any suitable manner. To the front beam is secured the tongue $b$ of my improved implement. In the forward end of the frame A is secured the front roller B. The construction of this will be clearly understood by reference to the drawing, from which it will be seen that it is made in two sections, $c\ c$, which are made to revolve beside each other by pivoting them on the same axle, and separating them by means of washers; or, as in the drawing, by securing a narrow strip or bar, $v$, of iron or other suitable material between the front and rear beams of frame A, and bolting to the same axle-stubs $t\ t$, that work in suitable boxes in the ends of rollers $c\ c$, that face the bar $v$. The other ends of the rollers may be provided with suitable projections or pivots $s\ s$, that work in bearings $r\ r$ in frame A. The manner in which the rollers are secured beside each other, however, is immaterial. Immediately behind roller B is pivoted the lateral bar D, having a series of teeth, $e$. The manner in which the teeth $e$ are placed is illustrated in Fig. 4 of the drawings, from which it will be seen that from the middle the teeth have an outward slant, thus leaving a blank space at the center of the bar. The object of this is to enable my improved implement to be used for cultivating young corn without injury to the plants, this being done by straddling the row, when the soil on both sides will be stirred by the teeth without their touching the young plants. The bar D is furnished with an upward-projecting lever, E, which is so arranged as to be convenient to the driver, whose seat G is arranged above bar D, as shown. From the driver's seat to the front beam of frame A extends a bar, $g$, having a series of notches, $n$, in either of which the lever E may be secured, thus giving any pitch that may be desired to the teeth $e$. Behind the bar D the rear roller F is secured, in the same manner as the front roller. The two rollers are constructed exactly alike, the only difference being that the front roller is made of a larger diameter, and consequently is heavier than the rear roller. The object and advantages of this will be hereinafter more fully set forth.

The manner in which my improved land-roller operates will be easily understood from the foregoing description. The front roller passing over the soil presses it in any suitable degree, which is regulated by the size and weight of the roller. The toothed bar D, which follows, stirs and harrows the soil to a depth which is regulated by the pitch of the teeth, which is controlled by the driver by means of lever E. The rear roller following the bar, being much lighter than the front roller, simply compresses the soil enough to hold dampness and no more.

When the bar D becomes clogged, the teeth $e$ are simply brought backward, when the rear roller F seizes the refuse that has been collected by the teeth $e$, passes over it, and leaves it behind.

Having thus described my invention, I claim and desire to secure by Letters Patent of the United States—

1. The combination, within a frame, A, of the heavy front roller B, intermediate swinging bar D, having teeth $e$, and light rear roller F, substantially as and for the purpose shown and specified.

2. The farm implement, herein described, for rolling and cultivating the soil, consisting of frame A, sectional rollers B F, intermediate toothed bar D, having lever E, that engages with the notches $n$ in bar $g$, all constructed and arranged to operate substantially as and for the purpose shown and specified.

In testimony that I claim the foregoing as my own I have hereto affixed my signature in presence of two witnesses.

LOUIS M. STEGNER.

Witnesses:
 HENRY W. FILLEY,
 G. W. DOTY.